United States Patent [19]

Halsall et al.

[11] 4,328,545

[45] May 4, 1982

[54] DRIVERLESS VEHICLE AUTOGUIDE BY LIGHT SIGNALS AND TWO DIRECTIONAL DETECTORS

[75] Inventors: James R. Halsall, Runcorn; Michael H. E. Larcombe, Cannon Park; James R. Robertson, Northwich; Mark A. M. Rogers, Chester, all of England

[73] Assignee: Imperial Chemical Industries Limited, London, England

[21] Appl. No.: 62,902

[22] Filed: Aug. 1, 1979

[30] Foreign Application Priority Data

Aug. 1, 1978 [GB] United Kingdom ............... 7831850

[51] Int. Cl.³ ............... G06F 15/20; H04M 1/02; G01C 1/00
[52] U.S. Cl. ..................... 364/424; 180/167; 250/215; 356/152; 364/443
[58] Field of Search ............... 364/424, 436, 443, 444, 364/449, 460, 559, 461; 250/211 R, 215, 216, 222 R, 237 R; 356/152, 1; 180/167, 168

[56] References Cited

U.S. PATENT DOCUMENTS

| | | | |
|---|---|---|---|
| 3,687,556 | 9/1972 | Price et al. ........................ | 356/152 |
| 3,690,767 | 9/1972 | Missio et al. ....................... | 356/5 |
| 3,710,335 | 1/1973 | Lepley ............................. | 343/112 R |
| 3,875,405 | 4/1975 | Ferguson .......................... | 364/460 |
| 3,881,568 | 5/1975 | Ando et al. ........................ | 180/168 |
| 3,924,107 | 12/1975 | Sakai .............................. | 364/449 |
| 3,975,633 | 8/1976 | Larkin ............................. | 250/237 R |
| 4,039,916 | 8/1977 | Selam ............................. | 180/168 |
| 4,099,591 | 7/1978 | Carr .............................. | 180/168 |
| 4,112,294 | 9/1978 | Pressiat .......................... | 250/237 R |
| 4,119,900 | 10/1978 | Kremnitz ......................... | 364/424 |
| 4,137,984 | 2/1979 | Jennings et al. .................... | 180/168 |

FOREIGN PATENT DOCUMENTS

| | | | |
|---|---|---|---|
| 2459358 | 6/1975 | Fed. Rep. of Germany ...... | 180/168 |
| 1173442 | 12/1969 | United Kingdom . | |
| 1313928 | 4/1973 | United Kingdom . | |
| 1448623 | 9/1976 | United Kingdom . | |

OTHER PUBLICATIONS

Strother, J. A.; "Angular Position Sensor"; RCA Technical Notes; TN No. 834, p. 1; May 1969.

Primary Examiner—Errol A. Krass
Attorney, Agent, or Firm—Cushman, Darby & Cushman

[57] ABSTRACT

An unmanned vehicle capable of being automatously guided towards a predetermined destination by the geometrical computation of light signals received by at least two on-board detectors which relate the direction of each signal received to the axis of the vehicle. Useful in restricted areas such as automatic warehouses and loading bays.

8 Claims, 4 Drawing Figures

UNMANNED VEHICLE

Fig. 1 UNMANNED VEHICLE

DRIVERLESS VEHICLE AUTOGUIDE BY LIGHT SIGNALS AND TWO DIRECTIONAL DETECTORS

This invention relates to an unmanned vehicle guided towards a goal particularly to a vehicle guided by light signals.

Driverless vehicles are in common use especially in automatic warehouses and many are guided along predetermined paths which are either wires embedded in the floor or light beams marking out the track to be followed.

We now provide a navigation and guidance system which allows a roving automatic vehicle to be guided by means of on-board light sensitive detectors responsive to light emitted in all directions from stations of known position.

According to the present invention we provide a vehicle moveable within a predetermined area, having navigational means for determining its position and orientation in combination with a plurality of beacons which are located at stations fixed with respect to the area such that the vehicle, when in any position within the area, can receive light from at least two fixed stations; the navigational means comprising at least two direction-sensitive light detectors mounted on the vehicle, each detector comprising means for detecting light which it receives from the beacons, and means responsive to the detection of that light for indicating the direction from which the light is received, thereby to obtain bearings of each fixed station with respect to the orientation of the vehicle; and means to correlate the bearings thereby obtained with the positions of the fixed stations with respect to the area and the positions of the detectors with respect to the vehicle.

Correlations of the obtained bearings with the positions of the fixed stations and of the detectors to determine the position and orientation of the vehicle, are most readily carried out using a computer. This may then also be used for influencing the mechanical controls for the movement and steering of the vehicle in such a way that the vehicle is guided towards predetermined destinations.

The beacons suitably comprise constant omnidirectional light sources, although where higher power is required the light may be generated as a collimated beam or by using other suitable intense light sources for example a laser or a xenon-flasher suitably backed by a parabolic-mirror, constructed so that the collimated beam can sweep a horizontal circle. Alternatively, the signals may be generated by reflective or fluorescent objects illuminated by general background lighting or preferably illuminated specifically from a light source mounted on the vehicle. The detectors may then observe two different reflectors at known fixed stations or they may observe the extremities of one large reflector, these extremities providing the beacons at fixed stations.

By light we mean electromagnetic waves having wavelengths from 300 nm to 3,000 nm including visible, infra-red and ultraviolet wavelengths. Visible light is more easily generated, controlled and observed than light of other wavelengths for example when tested by maintenance personnel and we prefer to use visible wavelengths whenever possible.

It is essentially a geometrical system of navigation for which the vehicle is designed, and therefore it is not dependent upon knowing the speed of light (e.g. as radar requires) but only the directions of the beams observed. The advantage of this system is that the vehicle does not need to employ a compass on board with its attendant errors due to either magnetic material in surrounding environment or the vibration of the vehicle.

Each detector preferably comprises means for receiving light unidirectionally from the beacons, and means are provided for rotatably mounting the light-receiving means so that it receives light from each direction in turn as it rotates. The detector may be conventional light receivers having for example, only a vertical slit aperture for their sensitive area. In order to be able to characterise the directional aspect of the signal we prefer to mount each detector on a revolving base connected to a device for informing the computer of the angle of reception of each signal beam. An informing device which provides a signal which changes in discrete steps as the detector rotates is preferred, especially one in which the signal is in binary code with each step represented by an exclusive binary word. The binary code preferred is the Gray Code, and this may suitably be provided in the form of a shaft-angle and coder with a Gray Code commutator.

The use of two detectors only on the vehicle provides a workable arrangement in the majority of positions and orientations of the vehicle and arrangements of light sources: it has the advantage of a minimum number of components used with consequent advantages in the simplicity of processing the information therefrom by the computer. However it is possible for the two detectors and one light source to be linear or nearly so and in this arrangement the navigation becomes imprecise. It would be preferable therefore to give instruction to the vehicle when this situation is detected to turn through an angle sufficient to bring the vehicle axis and hence the detectors into a triangular position with the light once again. A superior embodiment of the invention would be to have at least three detectors mounted on the vehicle in triangular array, two of which are in use for navigation at any one time. If the two in use became collinear with the light source switching would automatically operate on the vehicle to bring the third detector into operation with one of the other two.

The constant known information, i.e. the positions of the first station with respect to the area and the positions of the detectors on the vehicle, together with the derived information, i.e. the measured bearings, is sufficient to calculate both the orientation and the position of the vehicle. For example, by using the Sine Rule, the distance between the detector and the beacons is immediately calculable. However, the simple geometrical calculation applies only when the vehicle is stationary because detection by the two detectors of light from any one beacon will not normally occur simultaneously, the order depending on the direction of rotation of the detectors. If the vehicle is moving its motion can, in general, be resolved into two components parallel and perpendicular to the direction of the beam from the beacon, and any perpendicular component of velocity will result in some error in the calculation; but this can be allowed for by using a correlated value for L, i.e. $L \pm \delta L$. The correction becomes increasingly important if the velocity of the vehicle becomes comparable with the speed of sweep of the detectors, although at low speeds the correction can normally be neglected. Nevertheless, it is preferred, as a matter of routine, to rotate the detectors synchronously, e.g. as described in more detail hereinafter, so that the largest errors which could otherwise be caused by such movement may be avoided.

Various embodiments of the unmanned vehicles, include barges floating on water, hovercraft, track laying vehicles steered by means of the tracks as employed in military tanks, and the more common types of wheeled vehicles steered by means of the wheels.

The preferred embodiment would be a four wheeled vehicle, normally steered by the front wheels, in accordance with known motor vehicle practice, but for close maneuvering in confined spaces such as the aisles between rows of warehouse racking, the preferred embodiment would include the provision of a limited degree of auxiliary steering of the rear wheels.

Whenever a plurality of unmanned vehicles are operating in any defined area it is desirable that some form of collision avoidance system is in operation. Each vehicle is therefore preferably fitted with an individual collision avoidance system, for example a reflective sonar, tactile or a radar device which will prevent the vehicle colliding with either another moving vehicle or a stationery object. The detectors may be pressure sensitive switches, other tactile devices or light reflectors.

On detection of a potential collision hazard by means of the proximity detectors a signal would be sent to the unmanned vehicles' control system which could then determine if the vehicle should be halted or if an alternative collision free route was available to the desired destination. Thus the navigational control from the computer on-board the vehicle is dominated by the collision avoidance control and only takes over navigational control once more when the danger of collision is past.

In order to conserve fuel with either of said driving units it is desirable that loaded vehicles should command priority over unloaded vehicles. To establish said priority each unmanned vehicle should be equipped with a nett-weight measuring transducer enabling load comparisons to be made.

The invention in all its aspect may be better understood by consideration of a preferred embodiment which will now be described by reference to the FIGS. 1-4 in which FIG. 1 is a perspective sketch of an unmanned vehicle showing the component parts;

Figure 1:
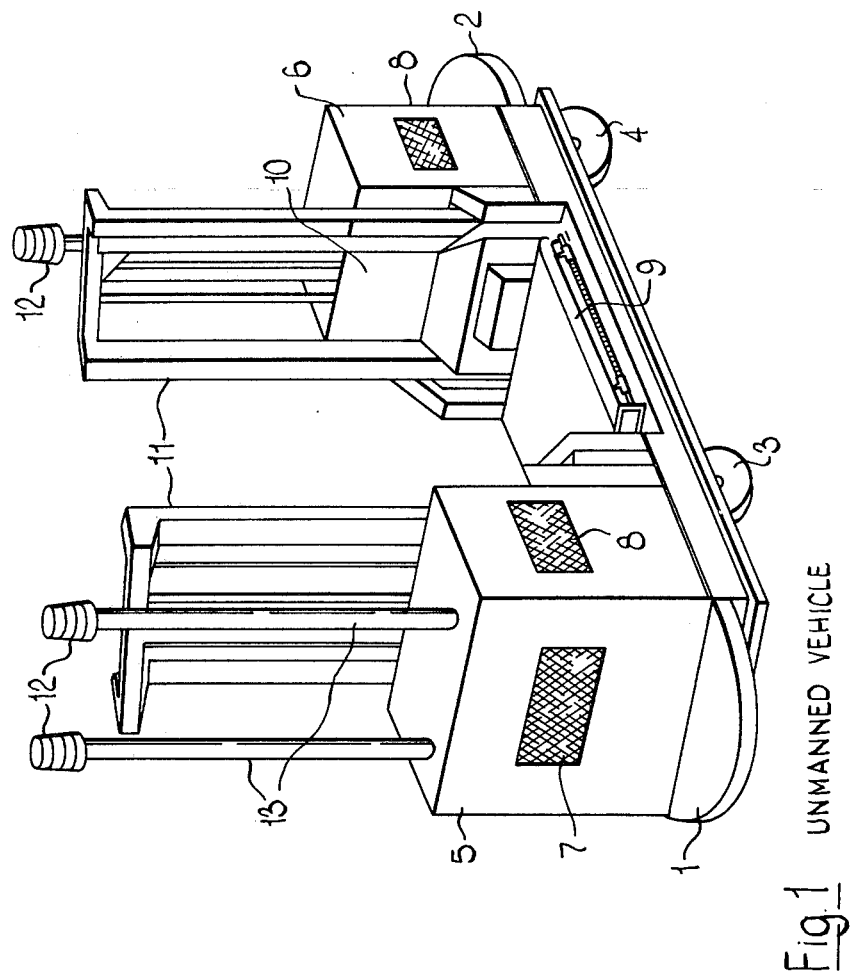

The vehicle shown in FIG. 1 has front and rear bumpers 1, 2 optionally fitted with switching to stop the vehicle if there is any impact of either bumper with other objects. Front wheels 3, are fitted with the main steering control but power driven rear wheels 4, are also capable of being steered to increase manoevrability of the vehicle in confined spaces. Front and rear equipment enclosures 5, 6 house electric storage batteries, drive motors, fuel tank (if vehicle powered by an internal combustion engine) and control systems for drive motors, steering mechanisms and load positioning. In addition a computer with a memory and a radio-communications link to a supervisory computer (not on the vehicle) are also contained in these equipment enclosures. Panels 7, 8 on the front and sides of the equipment enclosure contain close-proximity detectors which may be tactile sensors, sonar sensors or some other conventional form of accurate alignment of the vehicle with other surfaces for example loading and unloading stations.

A load-carrying platform 9 may be raised by lifting mechanism 10 sliding up and down pillars 11 which are constructed as a framework fore and aft of the load platform. The platform may be projected sideways in order to set down or pick-up a load. Navigational detectors 12 are mounted on masts 13 in order to give them a view of beacons uninterrupted by the body of the vehicle.

Figure 2:
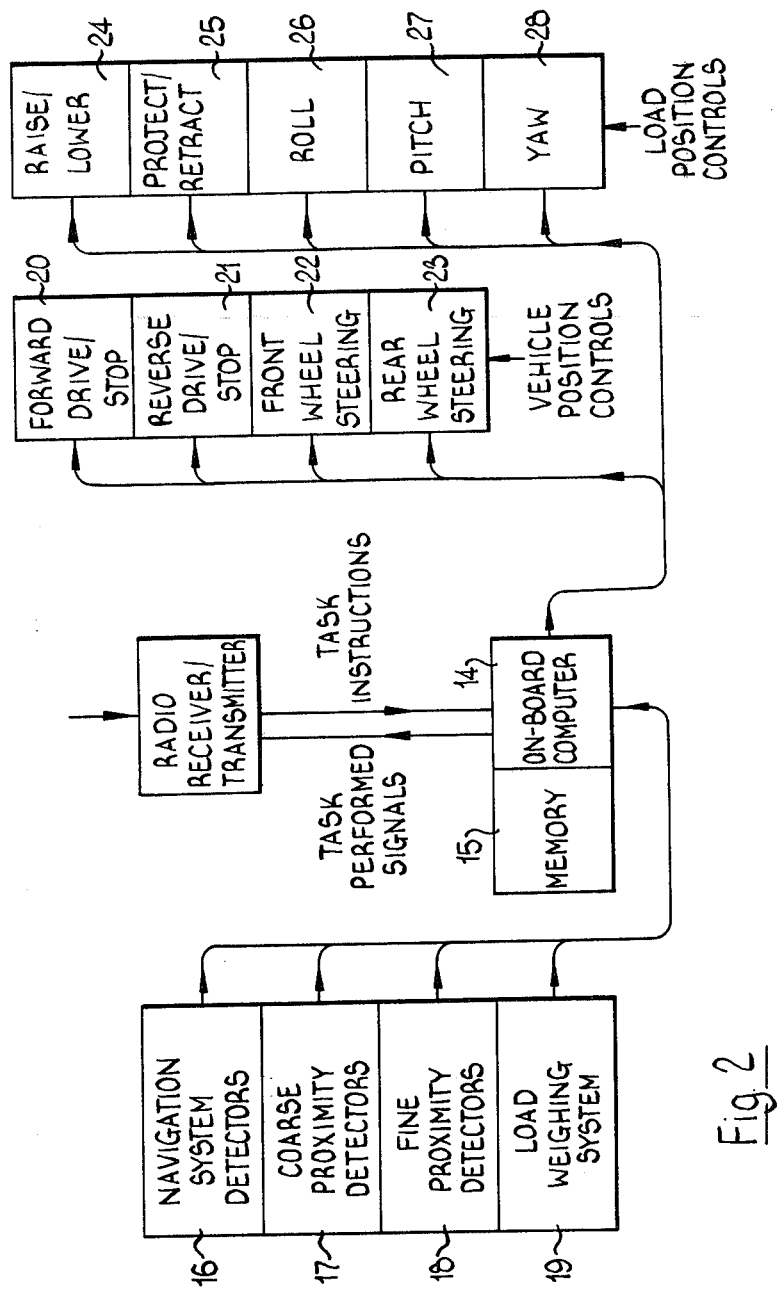
FIG. 2 is a block diagram of the computer control system for operation of the unmanned vehicle.

In FIG. 2 communication between the unmanned vehicle and a remote supervisor (not shown) from which the unmanned vehicle receives instructions to perform tasks, is achieved by means of a radio receiver/transmitter but other means of communication such as inductive loops or sound waves could be employed.

The task instructions, (which typically would specify a source location from which a load is to be picked up and a desired destination to which that load is to be transported and set down) provide one set of inputs to the on-board computer 14 and are stored in the computer memory 15 which also contains a map of the operational area of the vehicle. Additional computer inputs from navigation detectors 16, coarse and fine proximity detectors 17 and 18 and the load weighing system 19 are used to calculate a first collision-free course to the source location, and the vehicle automatically travels so that location by means of vehicle position control systems 20, 21, 22 and 23. On arrival at the source location the vehicle is halted and the load picked-up by means of the load position controls 24, 25, 26, 27 and 28.

A second collision free course from source to destination is then calculated by the computer in conjunction with the instructions stored in memory 15 and data inputs 16, 17, 18 and 19, and the vehicle automatically travels to that desired destination by means of vehicle position controls 20, 21, 22 and 23.

On arrival at the desired destination the vehicle is halted and the load set-down by means of the load position controls 24, 25, 26, 27 and 28.

On completion of this task the computer generates a task performed signal which is transmitted back to the supervisor via radio receiver/transmitter.

Figure 3:
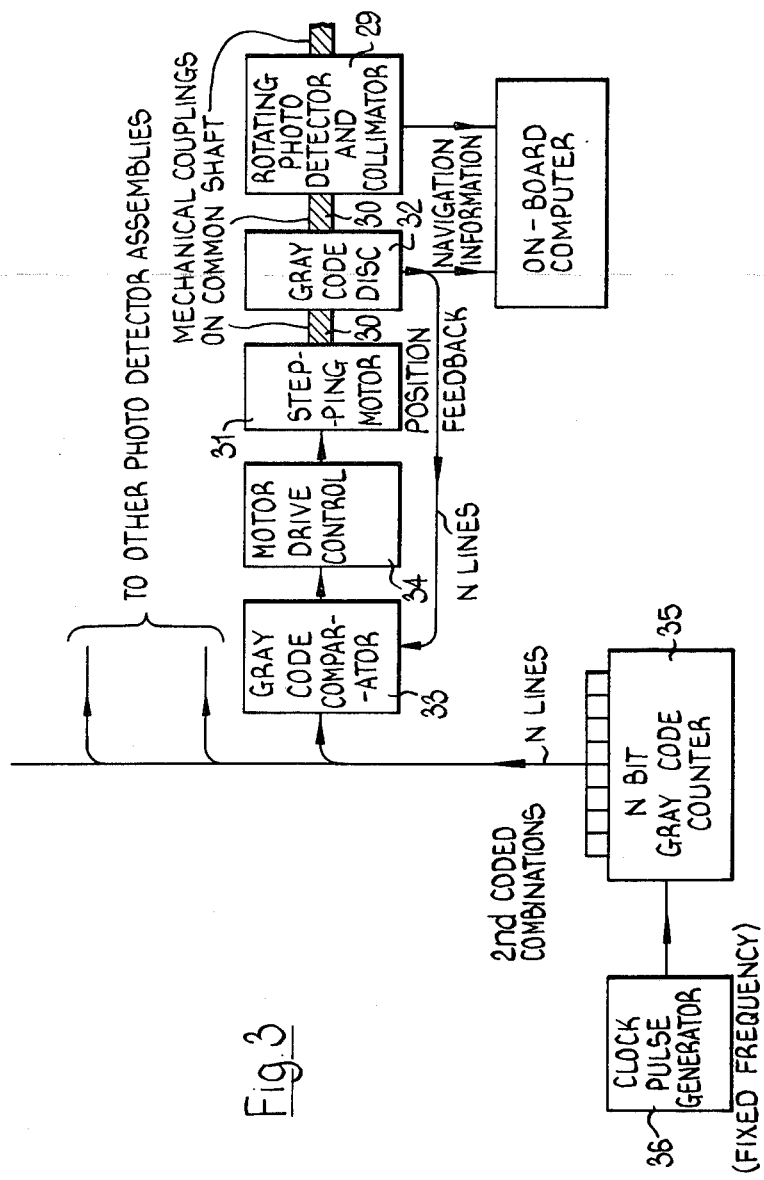
FIG. 3 is a block diagram of a photo detector assembly and the operation thereof in relation to the control system.

In FIG. 3 a collimated photo-detector 29 is coupled by mechanical couplings 30 to a stepping motor 31 and Gray code disc 32, such that the motor, code disc and photo detector rotate in unison. The coded output of the Gray code disc 32 passes through a zero datum value preferably when the photo detector is aligned with the forward axis of the vehicle, and in all other positions corresponds to the angle of reception of a beam of light with respect to that datum. The output of Gray code disc 32 forms a first input to the computer 14 and the output of photo detector 29 forms a second input to computer 14. Thus when the photo detector 29 indicates that light is being detected Gray code disc 32 indicates the angle of reception to computer 14. In the unmanned vehicle navigation system according to this invention at least two rotating photo detector assemblies of the type described are necessary and they must all rotate synchronously both in speed and in phase.

To achieve this synchronisation stepping motors 31 are arranged as components in a feed-back loop comprising motor drive control 34 and Gray code comparator 33. Gray code comparator 33 has a first input representing actual angular rotation from Gray code disc 32 and a second input representing desired angular rotation from Gray code counter 35. One example of a Gray code counter is disclosed in British Pat. No. 1,258,892. Any difference between the actual and desired angular rotations is detected by the comparator 33 and eliminated by signalling the motor drive control 34 to advance or retard stepping motor 31. Gray code counter 35 is fed with a pulse train from clock pulse generator 36 which would normally be of constant frequency but which might be arranged to increase in frequency at faster vehicle speeds.

The output of Gray code counter 35 increases from zero to full scale as pulses are received and overflows to zero once the full scale value has been reached, thus producing a cycle of Gray code values corresponding to those of the rotating Gray code disc 32. The Gray code counter 35 provides the desired angular rotation signal to each of the plurality of rotating photo detector assemblies on the unmanned vehicle.

Figure 4:
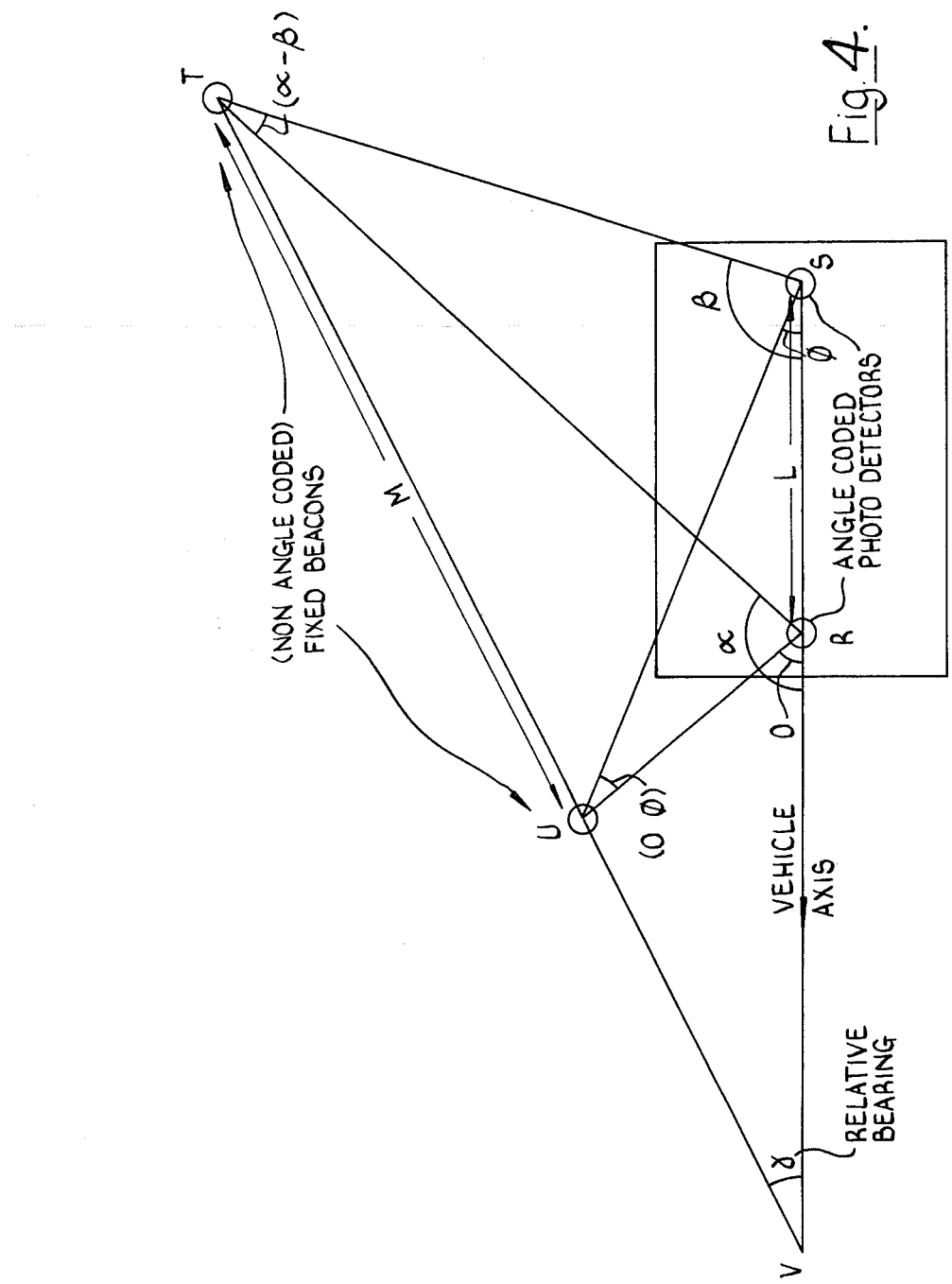
FIG. 4 is a geometrical drawing of the navigational information to be computed on-board the vehicle.

In FIG. 4, R and S are two angle-coded photodetectors on an unmanned vehicle. T and U are two beacons located at known positions M apart. The location of the vehicle can be computed by solving triangles RST and RSU by known sine law and then solving triangles UTS and URS by the same method.

The relative bearing $\gamma$ of the vehicle can be computed by angle comparison or by applying Freudenstein's equation for a four bar linkage as described in Transactions of American Society of Mechanical Engineers, August 1955, pages 853–861.

The precision of the navigational system has been calculated using a computer programme on which many different situations for the arrangement of beacons and vehicles could be simulated. It was assumed throughout the calculations that the angular resolution of both the emitters and detectors was $2\pi/1024$ radians. This was thought to be a practical value for components which would not be too expensive but if components having a finer resolution are available the precision of the navigation will be correspondingly improved.

The precision of navigation in restricted areas could be improved using the memory of the computer on board the vehicle. The history of movements and positions immediately preceding the entry into the restricted area can be used to reduce the error considerably: in general using "N" previous observations, the error may be improved by a factor of approximately $\sqrt{N}$.

For example if a vehicle having detectors 2 units apart enters an aisle 100 units long and a few units wide and can only observe emitters at the ends of the aisle the maximum positional errors may be as great as 8 units along the aisle but only 0.2 units across the aisle. However, if 16 previous observations are remembered and used to assess the position as the vehicle travels along the aisle the positional errors in a longitudinal direction may be reduced by a factor of four to 2 units.

What we claim is:

1. A vehicle moveable within a predetermined area and having navigational means for determining its position and orientation, in combination with a plurality of beacons which are located at stations fixed with respect to the area such that the vehicle, when in any position within the area, can receive light from beacons of at least two fixed stations; the navigational means comprising:

at least two direction-sensitive light detectors mounted on the vehicle, each detector comprising means for detecting light which it receives from the beacons, and means responsive to the detection of that light for indicating the direction from which the light is received so that the bearings of each fixed station with respect to the orientation of the vehicle are obtained, and means for correlating the bearings obtained by the light detection-responsive means with the positions of the fixed stations with respect to the area, and the positions of the detectors with respect to the vehicle.

2. A vehicle as claimed in claim 1 wherein each detector further comprises means for receiving light unidirectionally from the beacons, and means for rotatably mounting said light-receiving means so that it receives light from each direction in turn as it rotates.

3. A vehicle as claimed in claim 2 wherein the means for indicating the direction from which the light is received comprises means for providing a signal corresponding to the orientation of the unidirectional light-receiving means with respect to the vehicle, in response to detection of light from a beacon.

4. A vehicle as claimed in claim 3 wherein the signal changes in discrete steps as the detector rotates.

5. A vehicle as claimed in claim 4 wherein the signal is in a binary coded form, each discrete step being represented by an exclusive binary word.

6. A vehicle as claimed in claim 5 wherein the code is a Gray Code.

7. A vehicle as claimed in claims 1, 2, 3, 4, 5 or 6 wherein said at least two detectors comprises at least three detectors mounted on the vehicle in triangular array.

8. A vehicle as claimed in claims 1, 2, 3, 4, 5 or 6 further comprising means for synchronously rotating the detectors.

* * * * *